(12) United States Patent
Wessner et al.

(10) Patent No.: US 10,704,515 B2
(45) Date of Patent: Jul. 7, 2020

(54) DEVICE FOR METERING FUEL

(71) Applicant: Robert Bosch GmbH, Stuttgart (DE)

(72) Inventors: Jochen Wessner, Esslingen (DE);
Martin Katz, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/762,769

(22) PCT Filed: Jul. 25, 2016

(86) PCT No.: PCT/EP2016/067676
§ 371 (c)(1),
(2) Date: Mar. 23, 2018

(87) PCT Pub. No.: WO2017/050465
PCT Pub. Date: Mar. 30, 2017

(65) Prior Publication Data
US 2019/0078542 A1    Mar. 14, 2019

(51) Int. Cl.
*F02M 45/08* (2006.01)
*F02M 63/00* (2006.01)
(Continued)

(52) U.S. Cl.
CPC .......... *F02M 45/086* (2013.01); *F02M 43/04* (2013.01); *F02M 61/1806* (2013.01);
(Continued)

(58) Field of Classification Search
CPC .. F02M 45/086; F02M 43/04; F02M 63/0078; F02M 2200/46; F02M 43/00;
(Continued)

(56) References Cited

U.S. PATENT DOCUMENTS 4,382,554 A * 5/1983 Hofmann ............. F02M 45/086
239/533.9
5,199,398 A * 4/1993 Nylund ................. F02M 43/04
123/299
(Continued)

FOREIGN PATENT DOCUMENTS

CN      102705120 A     10/2012
DE      102014225167    6/2016
(Continued)

OTHER PUBLICATIONS

International Search Report for Application No. PCT/EP2016/067676 dated Sep. 8, 2016 (English Translation, 2 pages).

*Primary Examiner* — Hung Q Nguyen
*Assistant Examiner* — Susan E Scharpf
(74) *Attorney, Agent, or Firm* — Michael Best & Friedrich LLP

(57) ABSTRACT

The invention relates to a device for metering two different liquid or gaseous fuels, comprising a nozzle element (4) in which a first pressure chamber (6) that can be filled with a first fuel is formed, wherein an outer nozzle needle (10) is received in the pressure chamber in a longitudinally movable manner. The outer nozzle needle (10) is equipped with a second pressure chamber (12) which can be filled with a second fuel and in which an inner nozzle needle (15) is arranged in a longitudinally movable manner, said inner nozzle needle interacting with an inner nozzle seal (16) formed in the outer nozzle needle (10) in older to open and close at least one inner injection opening (17). Furthermore, at least one outer injection opening (13) is provided which can be connected to the first pressure chamber (6), the at least one outer injection opening (13) being formed in the outer nozzle needle (10).

13 Claims, 2 Drawing Sheets

(51) Int. Cl.
*F02M 43/04* (2006.01)
*F02M 61/18* (2006.01)
*F02M 61/06* (2006.01)
*F02M 51/06* (2006.01)

(52) U.S. Cl.
CPC ..... *F02M 63/0078* (2013.01); *F02M 51/0657* (2013.01); *F02M 61/06* (2013.01); *F02M 61/186* (2013.01); *F02M 2200/46* (2013.01)

(58) Field of Classification Search
CPC ............ F02M 45/083; F02M 51/0628; F02M 51/0657; F02M 61/06; F02M 61/1806; F02M 61/186; F02M 61/1873
USPC ........................................................ 123/299
See application file for complete search history.

(56) References Cited

U.S. PATENT DOCUMENTS

| | | | |
|---|---|---|---|
| 6,279,840 B1 | 8/2001 | Buckley | |
| 8,839,763 B2 * | 9/2014 | Mittal | F02M 45/086 123/304 |
| 9,453,483 B2 * | 9/2016 | Kim | F02M 63/008 |
| 2004/0256495 A1 * | 12/2004 | Baker | F02M 43/02 239/533.2 |
| 2007/0040053 A1 * | 2/2007 | Date | F02M 61/1846 239/533.2 |
| 2009/0020631 A1 * | 1/2009 | Mashida | F02D 19/10 239/533.3 |
| 2009/0139487 A1 * | 6/2009 | Dingle | F02M 61/06 123/445 |
| 2013/0047964 A1 * | 2/2013 | Kim | F02M 63/008 123/478 |
| 2013/0200174 A1 * | 8/2013 | Jeon | F02M 43/04 239/66 |
| 2013/0319373 A1 * | 12/2013 | Brown | F02M 43/04 123/456 |
| 2014/0123937 A1 * | 5/2014 | Wickstone | F02D 19/10 123/299 |
| 2015/0267659 A1 | 9/2015 | Jaegle et al. | |
| 2017/0159625 A1 * | 6/2017 | Brasche | F02M 43/04 |
| 2018/0073447 A1 * | 3/2018 | Wickstone | F02M 45/083 |

FOREIGN PATENT DOCUMENTS

| | | |
|---|---|---|
| EP | 1435453 A1 | 7/2004 |
| JP | 2007100643 A | 4/2007 |
| WO | 2012171119 | 12/2012 |
| WO | 2014186892 | 11/2014 |

* cited by examiner

DEVICE FOR METERING FUEL

BACKGROUND OF THE INVENTION

The invention concerns a device for metering fuel, preferably two different liquid or gaseous fuels. Such a device is used for example to deliver fuels to the combustion chamber of an internal combustion engine, for example in engines which can be operated with different fuels either alternately or simultaneously.

A device for metering two different fuels is known for example from the unpublished patent application DE 10 2014 225 167 A1. This device, in the form of a fuel injection valve, has two nozzle needles guided inside each other, wherein the outer nozzle needle is loaded with a gaseous fuel, and a liquid fuel, for example diesel fuel, is present in the interior of the outer nozzle needle. A nozzle seat is formed in the interior of the outer nozzle needle, with which seat the inner nozzle needle cooperates in order to open and close inner injection openings, so that on a longitudinal movement of the inner nozzle needle, the diesel fuel can be metered independently of the inflow of gaseous fuel. If gaseous fuels are injected at the same time or at temporally spaced intervals, the outer valve needle moves away from the outer valve seat and exposes injection openings in the nozzle body, through which the gaseous fuel can flow out. If the inner nozzle needle and outer nozzle needle can be controlled separately, both gaseous and liquid fuel can be injected independently of each other, which is important in particular for injecting fuel into a corresponding internal combustion engine which is to be operated with two different fuels.

The production of such a device is however complex since injection openings must be made both in the outer nozzle needle and in the nozzle body itself, in order to allow the through flow of gaseous fuel. If the two fuels are delivered into a combustion chamber in parallel, the additional difficulty arises that the injection openings of the liquid and gaseous fuel must stand in a fixed spatial relationship to each other, in order to configure the combustion optimally. This means that the outer nozzle needle and the inner nozzle needle must be mounted twist-resistantly relative to each other, which entails an additional technical complexity.

SUMMARY OF THE INVENTION

In comparison, the device according to the invention for metering two different fuels has the advantage that the production of this device is simpler and hence cheaper than that known from the prior art. For this, the device has a nozzle body in which a first pressure chamber is formed which can be filled with a first fuel and in which an outer nozzle needle is received in a longitudinally movable manner. Here, the outer nozzle needle is equipped with a second pressure chamber which can be filled with a second fuel and in which an inner nozzle needle is arranged in a longitudinally movable manner, said inner nozzle needle cooperating with an inner nozzle seat formed in the outer nozzle needle in order to open and close at least one inner injection opening. In addition, an outer injection opening is provided which can be connected to the first pressure chamber, wherein the at least one outer injection opening is formed in the outer nozzle needle.

By forming the outer injection opening in the outer nozzle needle, there is no need for such an injection opening in the nozzle body, so the latter can be produced more simply and hence more economically. Since the nozzle needle is produced as a separate component which in any case requires complex machining but is accessible from all sides during machining, the additional injection openings can easily be formed in the outer nozzle needle. In addition, this gives the advantage that the inner injection openings and the outer injection openings fixedly retain their desired spatial correlation without the need for additional technical measures, such as securing the nozzle needles against twisting in the nozzle body. In addition, the advantage arises that, through its opening movement inside the device, the outer nozzle needle also moves the inflow jet of the gaseous fuel or one of the two fuels during inflow or injection, which promotes an additional eddying of the fuel inside the combustion chamber and hence a more favorable combustion process.

In a first advantageous embodiment, the nozzle body is equipped with an outer nozzle seat with which the outer nozzle needle cooperates in order to open and close the at least one outer injection opening. In this way, the outer injection openings can be opened and closed by a simple longitudinal movement of the outer nozzle needle, and hence the first fuel can be metered accordingly.

In a further advantageous embodiment, a circumferential ring groove is formed on the outside of the outer nozzle needle, from which groove the at least one outer injection opening departs. Thus the circumferential ring groove is formed preferably downstream of the outer nozzle seat, so that when the outer nozzle needle lifts away from the outer valve seat, said groove is filled with the first fuel which is present in the first pressure chamber, and from there the fuel is ejected through the outer injection openings.

In a further advantageous embodiment, on its end facing the outer nozzle seat, the nozzle body has a cylindrical guide portion in which the outer nozzle needle is guided. This ensures that the nozzle needle is always positioned precisely in relation to the outer valve seat and hence seals optimally on said valve seat. The outer valve needle here advantageously comprises a cylindrical portion via which it is guided in the cylindrical guide portion. Particularly advantageously, here also the outer sealing seat in the nozzle body is configured as a conical surface, which guarantees a good seal. By the longitudinal movement of the outer needle away from the outer nozzle seat, a flow cross-section between the outer nozzle needle and the outer nozzle seat is advantageously created, through which the fuel can flow from the first pressure chamber to the at least one outer injection opening.

In a further advantageous embodiment, with its end facing away from the outer nozzle seat, the outer nozzle needle delimits a first control chamber which can be filled with fuel. This may be both the first and the second fuel, but usually only a liquid fuel is concerned since a gaseous fuel is too compressible. In advantageous fashion, here a varying pressure can be set in the first control chamber via a first control valve, so that a hydraulic closing force on the outer nozzle needle can be varied and hence its longitudinal movement controlled.

In a further advantageous embodiment, with its end facing away from the inner nozzle seat, the inner nozzle needle delimits a second control chamber which can also be filled with the first or second fuel. Advantageously, a second control valve is present, via which a varying pressure can be set in the second control chamber so that the longitudinal movement of the inner nozzle needle can be controlled by the second control valve.

Further advantages and advantageous embodiments are disclosed in the description and the drawing.

BRIEF DESCRIPTION OF THE DRAWINGS

The drawing shows a device according to the invention. In the drawing.

DETAILED DESCRIPTION

Figure 1:
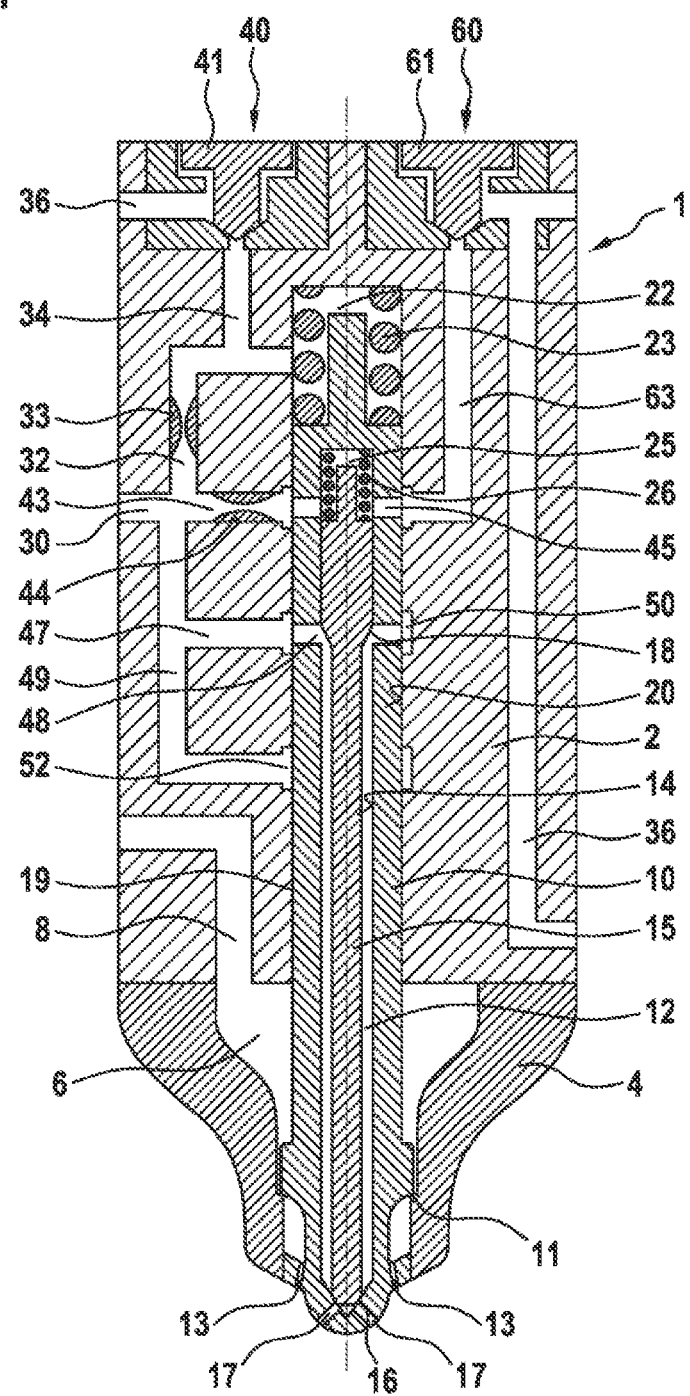
FIG. 1 shows, in a diagrammatic depiction, a longitudinal section through a device according to the invention, wherein only the essential components are shown.

FIG. 1 shows a longitudinal section through a device according to the invention for metering two different fuels. The device, in the form of a fuel injection valve, has a housing 1 which comprises a holding body 2 and a nozzle body 4, wherein the holding body 2 and the nozzle body 4 are clamped together fixedly by a device not shown in the drawing. A first pressure chamber 6 is formed in the nozzle body 4 and can be filled with a first fuel via a first supply channel 8 formed in the holding body 2. The first fuel is here preferably a gaseous fuel. The first pressure chamber 6 holds an outer nozzle needle 10 in a longitudinally movable manner, wherein said needle continues into a bore 20 formed in the holding body 2. The outer nozzle needle 10 is here configured as a hollow needle, and in its interior has a longitudinal bore 14 which holds an inner nozzle needle 15 in a longitudinally movable manner. The inner nozzle needle 15 here cooperates with an inner nozzle seat 16 formed in the interior of the outer nozzle needle 10, so that by the cooperation of the inner nozzle needle 15 with the inner valve seat 16, one or more inner injection openings 17 can be opened and closed. Between the inner nozzle needle 15 and the outer nozzle needle 10, a second pressure chamber 12 is formed which can be filled with a second fuel, for example with a gaseous fuel.

The outer nozzle needle 10 cooperates with an outer nozzle seat 11 formed in the interior of the nozzle body 4. When the outer nozzle needle 10 rests on the outer nozzle seat 11, the pressure chamber 6 is closed, whereas when the outer nozzle needle 10 lifts away from the outer nozzle seat 11, the fuel flows from the first pressure chamber 6 between the outer nozzle needle 10 and the outer nozzle seat 11 into the outer injection openings 13 which are formed in the outer nozzle needle 10.

The second fuel for filling the second pressure chamber 12 is supplied to the housing 1 via a high-pressure supply channel 30 formed in the holding body 2. This second fuel, which is for example a liquid fuel, in particular diesel or petrol, then enters various channels and thus reaches the second pressure chamber 12, but also provides the control pressure for controlling the closing force on the inner and outer nozzle needles so that their longitudinal movements can be controlled servo-hydraulically. The individual channels in the holding body 2 and their function are as follows.

To control the needle movement of the outer valve needle 15, a first control chamber 22 is provided which is delimited by the bore 20 and the end face of the outer nozzle needle 10 facing away from the outer injection openings 13. An outer closing spring 23, under pressure preload, is arranged in the first control chamber 22 and exerts a closing force on the outer nozzle needle 10 in the direction of the outer nozzle seat 11. To fill the first control chamber 22, a control bore 32 is provided which branches off the high-pressure supply channel 30 and in which a choke 33 is formed. To relieve the pressure in the first control chamber 22, an outlet bore 34 is provided which departs from the control bore 32 and leads to a first control valve 40. The first control valve 40 contains a first control valve element 41, which can be moved by means of an electromagnet and which opens and closes an outlet cross-section between the outlet bore 34 and the low-pressure line 36. The low-pressure line 36, shown on the left in the figure, is here identical to the low-pressure line 36 shown on the right-hand part of the drawing in FIG. 1, wherein the connection is not depicted in the drawing for the sake of simplicity. The low-pressure line 36 is connected to a low-pressure chamber, also not shown in the drawing, in which a low fuel pressure always prevails.

Furthermore, a supply bore 43 branches off the high-pressure supply channel 30 and contains a supply choke 44, so that the second fuel flowing through this flows into a control chamber 25 via transverse bores 45 formed in the outer nozzle needle 10; said control chamber is formed inside the outer nozzle needle 10 and delimited by the end face of the inner nozzle needle 15 facing away from the inner injection openings 17. An inner closing spring 26, under pressure preload, is arranged inside the second control chamber 20 and exerts a closing force on the inner nozzle 15 in the direction of the inner nozzle seat 16. Via a further transverse bore 45 in the outer nozzle needle 10, the fuel can flow further into a second outlet bore 63 and from there to a second control valve 60 configured as an electromagnetic control valve. The second control valve 60 here comprises a second control valve element 61 which can be moved by an electromagnet and hence opens and closes an outlet cross-section, via which the second outlet bore 63 can be connected to the low-pressure line 36.

To supply the second control chamber 12 with fuel under high pressure, a further supply bore 49 is provided which also branches off the high-pressure supply channel 30 and again opens into a supply bore 47. The supply bore 47 is configured as a transverse bore inside the holding body 2 and connects the high-pressure supply channel 30 to a further transverse bore 48 formed in the outer nozzle needle 10, wherein the further transverse bore 48 opens into the second pressure chamber 12 so that filling of the second pressure chamber 12 is guaranteed. A first ring groove 50 is formed in the bore 20, into which the supply bore 47 opens so that a hydraulic connection always exists between the supply bore 47 and the further transverse bore 48, independently of the longitudinal position of the outer valve needle 10.

In order to provide a slip film, created by the first fuel, on the outside for the movement of the outer needle 10 inside the bore, the bore 20 furthermore comprises a second ring groove 52 formed between the first ring groove 50 and the first pressure chamber 6. The further supply bore 49 opens into the second ring groove 52, so that here fuel is present under a relatively high pressure. The first fuel present here is a liquid fuel, so that a pressure fall exists and a constant leakage flow is guaranteed between the second ring groove 52 and the first pressure chamber 6, via a leakage gap 19 formed between the outer nozzle needle 10 and the wall of the bore 20. The liquid fuel flowing into the first pressure chamber 6 is carried along with the first fuel when the outer nozzle needle 10 opens, and hence also reaches the combustion chamber of the corresponding internal combustion engine without any negative effects on the combustion. By dimensioning the choke gap 10 correspondingly small, it is ensured that the quantity of liquid fuel flowing into the first pressure chamber 6 easily reaches the combustion chamber via the outer injection openings 13.

The function of the device for metering two different fuels is as follows:

At the beginning of fuel delivery, a pressure level prevailing in the first pressure chamber 6 is suitable for the first fuel, and for a liquid fuel, e.g. natural gas, amounts to at least a few bar. In the region of the device filled with the liquid fuel, a higher injection pressure prevails which, on use of diesel fuel, amounts to at least a few hundred bar, but pressures of up to 2500 bar or even higher are possible. Due to the high pressure in both the first control chamber 22 and in the second control chamber 25, it is guaranteed that both the inner nozzle needle 15 and the outer nozzle needle 10 rest on the respective nozzle seats and close both the inner injection openings 17 and the outer injection openings 13. If injection takes place solely with liquid fuel, only the second control valve 60 is opened, so that the second control chamber 25 is pressure-relieved via its now open connection to the low-pressure line 36, whereby the hydraulic pressure in the second control chamber 25 diminishes and, correspondingly, the hydraulic closing force on the inner nozzle needle 10. Driven by the fuel pressure in the second pressure chamber 12, the inner nozzle needle 15 then moves away from the inner nozzle seat 16 against the force of the inner closing spring 26, and opens the inner injection openings 17 so that fuel emerges from the second pressure chamber 12 through the inner injection openings 17, and is finely atomized because of the high fuel pressure. After closure of the second control valve 60, because of the connection via the through-flow bore 43, the original high fuel pressure again builds up in the second control chamber 25 and presses the inner nozzle needle 15 back into its closed position, closing the inner injection openings 17.

If—also or only—the outer nozzle needle 19 is now moved, in contrast the first control valve 40 is opened so that the pressure in the first control chamber 22 collapses due to the connection via the outlet bore 34. The hydraulic closing pressure inside the first control chamber 22, which then also diminishes, now allows a movement of the outer nozzle needle 10 because of the pressure in the first control chamber 6, so that the outer nozzle needle 10 lifts away from the outer nozzle seat, and gaseous fuel from the first control chamber 6 flows to the outer injection openings 13. After the first control valve 40 has closed, the original state is restored again, and the outer nozzle needle 10 closes the outer injection opening 13.

Figure 2:
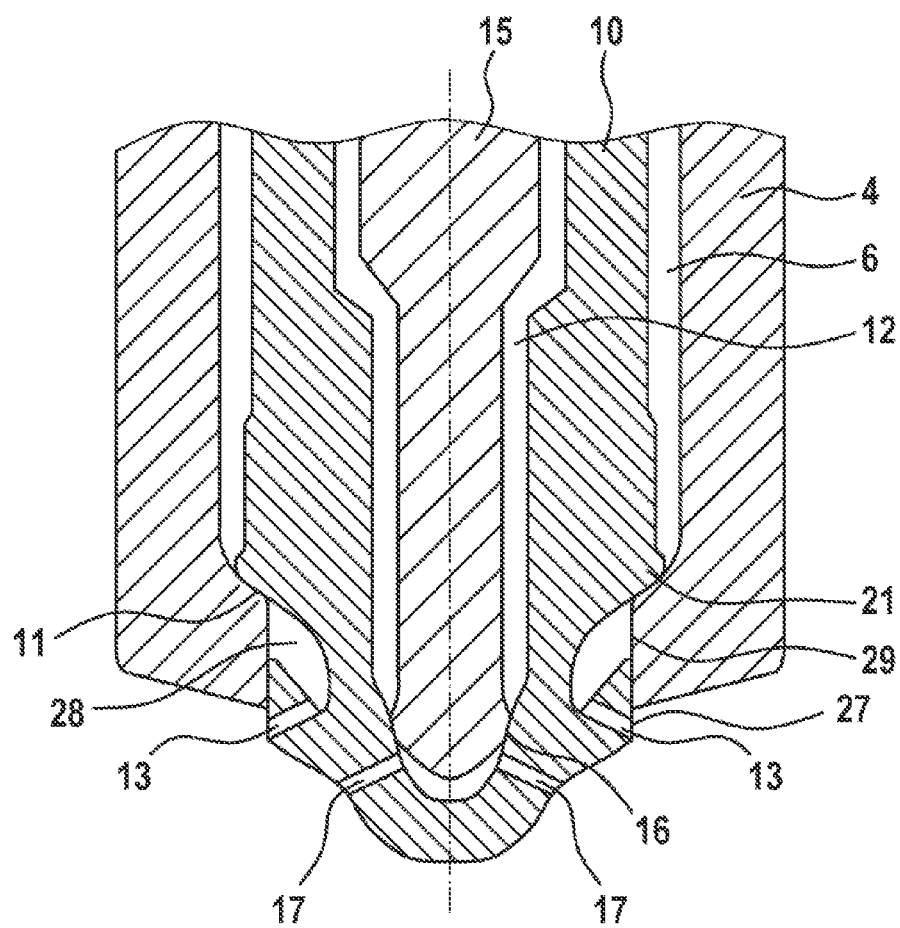
FIG. 2 shows an enlarged depiction of the lower end of the device according to the invention with the injection openings.

The precise configuration of the nozzle seats is shown in enlarged detail in FIG. 2. At its end facing the combustion chamber, the nozzle body 4 has a cylindrical guide portion 29 in which the outer nozzle needle 10 is guided via its also cylindrical portion 27. Between the outer nozzle seat 11 and the outer injection openings 13, a circumferential ring groove 28 is formed on the outside of the outer nozzle needle 10. The outer injection openings 13 depart from the ring groove 28, so that gaseous fuel, which flows out of the first pressure chamber 6 between the outer nozzle seat 11 and the outer nozzle needle 10 into the ring groove 28, flows out from there through the outer injection openings 13. Both the outer injection openings 13 and the inner injection openings 17 are formed inside the outer valve needle 10, so the injection openings 13, 17 are arranged in a fixed spatial relationship to each other which remains constant throughout the entire operation. For example, an outer injection opening 13 and an inner injection opening 15 may be arranged above each other in each case, so that they are arranged in a longitudinal plane of the fuel injection valve; they may also however be arranged offset to each other. Also the number of outer and inner injection openings 13, 17 may be selected arbitrarily. Also, the diameters of the injection openings will usually be different since gaseous fuel is injected through the outer injection openings 13, which requires a relatively large flow cross-section, while the injection of liquid fuel, for example diesel, from the second control chamber 12 through the inner injection openings 17 is accompanied by high pressure and a small cross-section of the injection openings, in order to guarantee a reliable atomization of the fuel and hence a secure combustion.

What is claimed is:

1. A device for metering two different liquid or gaseous fuels, with a nozzle body (4) forming a first pressure chamber (6) which can be filled with a first fuel and in which an outer nozzle needle (10) is received in a longitudinally movable manner, wherein the outer nozzle needle (10) is equipped with a second pressure chamber (12) which can be filled with a second fuel and in which an inner nozzle needle (15) is arranged in a longitudinally movable manner, said inner nozzle needle cooperating with an inner nozzle seat (16) formed in the outer nozzle needle (10) in order to open and close at least one inner injection opening (17) formed in the outer nozzle needle, and with at least one outer injection opening (13) configured to be connected to the first pressure chamber (6) when the outer nozzle needle is open, characterized in that the at least one outer injection opening (13) is formed in the outer nozzle needle (10).

2. The device as claimed in claim 1, characterized in that the nozzle body (4) is equipped with an outer nozzle seat (11) with which the outer nozzle needle (10) cooperates in order to open and close the at least one outer injection opening (13), and wherein the outer nozzle needle is open when the outer nozzle needle is not seated on the outer nozzle seat (11).

3. The device as claimed in claim 2, characterized in that a circumferential ring groove (28) is formed on an outside of the outer nozzle needle (10) downstream of the outer nozzle seat (11), from which groove the at least one outer injection opening (13) departs.

4. The device as claimed in claim 2, characterized in that on an end facing the outer nozzle seat (11), the nozzle body (4) has a cylindrical guide portion (29) in which the outer nozzle needle (10) is guided.

5. The device as claimed in claim 4, characterized in that the outer valve needle (10) has a cylindrical portion (27) via which the outer valve needle (10) is guided in the cylindrical guide portion (29).

6. The device as claimed in claim 2, characterized in that the outer sealing seat (11) in the nozzle body (4) is formed as a conical surface.

7. The device as claimed in claim 2, characterized in that by longitudinal movement of the outer nozzle needle (10) away from the outer nozzle seat (11), a flow cross-section is created between the outer nozzle needle (10) and the outer nozzle seat (11), through which the fuel can flow from the first pressure chamber (6) to the at least one outer injection opening (13).

8. The device as claimed in claim 2, characterized in that with an end facing away from the outer nozzle seat (11), the outer nozzle needle (10) delimits a first control chamber (22) configured to be filled with the first fuel.

9. The device as claimed in claim 8, further comprising a first control valve (40) configured to set a varying pressure in the first control chamber (22).

10. The device as claimed in claim 1, characterized in that with an end facing away from the inner nozzle seat (16), the inner nozzle needle (15) delimits a second control chamber (25) configured to be filled with the second fuel.

11. The device as claimed in claim 10, further comprising a second control valve (60) configured to set a varying pressure in the second control chamber (25).

12. The device as claimed in claim 1, characterized in that the first fuel is gaseous and the second fuel is liquid.

13. The device as claimed in claim 1, characterized in that the device is configured for delivering fuel directly into a combustion chamber of an internal combustion engine.

* * * * *

UNITED STATES PATENT AND TRADEMARK OFFICE
CERTIFICATE OF CORRECTION

PATENT NO. : 10,704,515 B2
APPLICATION NO. : 15/762769
DATED : July 7, 2020
INVENTOR(S) : Wessner et al.

Page 1 of 1

It is certified that error appears in the above-identified patent and that said Letters Patent is hereby corrected as shown below:

On the Title Page

Column 1, please add:
-- (30) Foreign Application Priority Data
Sep. 23, 2015 (DE) 10 2015 218 257.6 --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*